United States Patent
Murakami et al.

(10) Patent No.: US 11,594,925 B2
(45) Date of Patent: Feb. 28, 2023

(54) ROTOR OF ROTARY ELECTRIC MACHINE FOR VEHICLE

(71) Applicant: TOYOTA JIDOSHA KABUSHIKI KAISHA, Toyota (JP)

(72) Inventors: Yukinori Murakami, Toyota (JP); Yoshitada Yamagishi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 96 days.

(21) Appl. No.: 17/169,608

(22) Filed: Feb. 8, 2021

(65) Prior Publication Data
US 2021/0249921 A1  Aug. 12, 2021

(30) Foreign Application Priority Data
Feb. 12, 2020  (JP) .............................. JP2020-021901
Nov. 13, 2020  (JP) .............................. JP2020-189822

(51) Int. Cl.
*H02K 1/28*  (2006.01)
*H02K 1/02*  (2006.01)

(52) U.S. Cl.
CPC ................ *H02K 1/28* (2013.01); *H02K 1/02* (2013.01)

(58) Field of Classification Search
CPC ........ H02K 1/28; H02K 1/02; H02K 2213/12; H02K 1/2766; H02K 1/274
See application file for complete search history.

(56) References Cited

U.S. PATENT DOCUMENTS

| | | |
|---|---|---|
| 6,122,817 A | 9/2000 | Meacham et al. |
| 2007/0126304 A1 | 6/2007 | Ito et al. |
| 2014/0368082 A1 | 12/2014 | Barton |
| 2017/0085160 A1* | 3/2017 | Mae ........................ H02K 15/03 |
| 2017/0264153 A1 | 9/2017 | Groschup et al. |
| 2019/0020248 A1* | 1/2019 | Weber ................ H02K 15/0012 |
| 2020/0350794 A1* | 11/2020 | Liu ........................... H02K 1/28 |

FOREIGN PATENT DOCUMENTS

| | | |
|---|---|---|
| DE | 10 2018 205 258 A1 | 10/2019 |
| JP | 2005-151648 A | 6/2005 |
| JP | 2010-226830 A | 10/2010 |
| JP | 2010-252423 A | 11/2010 |
| JP | 2014-036471 A | 2/2014 |
| JP | 2014-87075 A | 5/2014 |
| JP | 2020-5478 A | 1/2020 |
| WO | WO 2014/090050 A1 | 6/2014 |
| WO | WO 2019/214252 A1 | 11/2019 |

OTHER PUBLICATIONS

Extended European Search Report dated Jun. 28, 2021 in corresponding European Patent Application No. 21155942.2, 10 pages.

* cited by examiner

*Primary Examiner* — Thomas Truong
(74) *Attorney, Agent, or Firm* — Oblon, McClelland, Maier & Neustadt, L.L.P.

(57) ABSTRACT

A rotor of a rotary electric machine for a vehicle includes a rotor shaft and a rotor core including a plurality of electromagnetic steel plates fitted to an outer peripheral surface of a rotor shaft in an interference fit state or a transition fit state. A strength of the electromagnetic steel plate disposed in at least one of end portions of the rotor core in an axial direction of the rotor shaft is set to be higher than a strength of the electromagnetic steel plate disposed in a central portion of the rotor core in the axial direction of the rotor shaft.

9 Claims, 6 Drawing Sheets

ROTOR OF ROTARY ELECTRIC MACHINE FOR VEHICLE

CROSS-REFERENCE TO RELATED APPLICATION

This application claims priority to Japanese Patent Application No. 2020-021901 filed on Feb. 12, 2020, incorporated herein by reference in its entirety.

BACKGROUND

1. Technical Field

The disclosure relates to a structure of a rotor of a rotary electric machine for a vehicle.

2. Description of Related Art

A rotor of a rotary electric machine for a vehicle having a configuration in which a rotor core including a plurality of electromagnetic steel plates is fitted to a rotor shaft is known. An example of such rotor is a rotor of a rotary electric machine disclosed in Japanese Unexamined Patent Application Publication No. 2014-36471 (JP 2014-36471 A). JP 2014-36471 A describes that a strength of an electromagnetic steel plate that is disposed in a central portion in an axial direction of a rotor shaft is increased among the electromagnetic steel plates that are shrink-fitted to the rotor shaft, compared to a strength of an electromagnetic steel plate that is disposed in an end portion in the axial direction of the rotor shaft.

SUMMARY

The rotor core has a larger stress acting on the electromagnetic steel plate disposed in the end portion in the axial direction of the rotor shaft in a state where the rotor core is assembled to the rotor shaft. Therefore, there is a concern about reliability of the electromagnetic steel plate disposed in the end portion in the axial direction of the rotor shaft when the configuration disclosed in JP 2014-36471 A is adopted. Further, a use quantity of high-strength electromagnetic steel plates increases when the high-strength electromagnetic steel plate is used in the central portion in the axial direction of the rotor shaft, which is disadvantageous in terms of cost.

The disclosure can provide a structure in which the use quantity of the high-strength electromagnetic steel plates is reduced while the reliability of the rotor core is maintained in the rotor of the rotary electric machine for the vehicle.

A rotor of a rotary electric machine for a vehicle according to a first aspect of the disclosure includes: a rotor shaft; and a rotor core including a plurality of electromagnetic steel plates fitted to an outer peripheral surface of the rotor shaft in an interference fit state or a transition fit state. A strength of the electromagnetic steel plate disposed in at least one of end portions of the rotor core in an axial direction of the rotor shaft is set to be higher than a strength of the electromagnetic steel plate disposed in a central portion of the rotor core in the axial direction of the rotor shaft.

With the configuration above, the strength of the electromagnetic steel plate disposed in at least one of end portions of the rotor core in the axial direction of the rotor shaft is set to be higher than the strength of the electromagnetic steel plate disposed in the central portion of the rotor core in the axial direction of the rotor shaft. Therefore, in the state where the rotor core is assembled to the rotor shaft, the stress acting on the electromagnetic steel plates disposed in the end portions in the axial direction of the rotor shaft is higher than the stress acting on the electromagnetic steel plate disposed in the central portion. However, the electromagnetic steel plates having high strength are disposed in the end portions in the axial direction of the rotor shaft such that the stress acting on the end portions can be endured. Accordingly, reliability of the rotor core is maintained. Further, in the rotor core, the electromagnetic steel plate having a low strength is disposed in the central portion of the rotor core in the axial direction of the rotor shaft in consideration that the stress acting on the central portion is small, which can reduce the use quantity of the high strength electromagnetic steel plates as a whole of the rotor core.

According to the aspect above, the strength of the electromagnetic steel plate disposed in each of the end portions of the rotor core in the axial direction of the rotor shaft may be set to be higher than the strength of the electromagnetic steel plate disposed in the central portion of the rotor core in the axial direction of the rotor shaft.

With the configuration above, the strength of the electromagnetic steel plate disposed in each of the end portions of the rotor core is set higher than the strength of the electromagnetic steel plate disposed in the central portion of the rotor core in the axial direction of the rotor shaft. Therefore, although the stress acting on the electromagnetic steel plates disposed in the end portions of the rotor core in the axial direction of the rotor shaft becomes high, the high stress can be endured because the electromagnetic steel plates having high strength are disposed in the end portions of the rotor core.

According to the aspect above, the electromagnetic steel plates may include a first electromagnetic steel plate and a second electromagnetic steel plate that is made of a material having a higher mechanical strength than a mechanical strength of the first electromagnetic steel plate, and the first electromagnetic steel plate may be disposed in the central portion of the rotor core in the axial direction of the rotor shaft, and the second electromagnetic steel plate may be disposed in each of the end portions of the rotor core in the axial direction of the rotor shaft.

With the configuration above, the second electromagnetic steel plates made of higher mechanical strength than that of the first electromagnetic steel plate are disposed in the end portions of the rotor core in the axial direction of the rotor shaft such that the first electromagnetic steel plate disposed in the central portion of the rotor core in the axial direction of the rotor shaft is interposed between the second electromagnetic steel plates. Therefore, although a high stress acts on the electromagnetic steel plates disposed in the end portions of the rotor core in the axial direction of the rotor shaft, the second electromagnetic steel plates having higher strength than that of the first electromagnetic steel plate receive the stress, which make it possible to endure the stress.

According to the aspect above, the rotor core may include at least two types of the electromagnetic steel plates having different thicknesses from each other, and the thickness of the electromagnetic steel plate disposed closer to an end portion of the rotor core in the axial direction of the rotor shaft may be increased.

With the configuration above, the rotor core is composed of two or more types of electromagnetic steel plates having different thicknesses from each other, and the thickness of the electromagnetic steel plates disposed closer to the end portions of the rotor core in the axial direction of the rotor shaft is increased. Therefore, the electromagnetic steel plates disposed closer to the end portions of the rotor core in the axial direction of the rotor shaft have higher strength. Therefore, although the stress acting on the electromagnetic steel plates disposed closer to the end portions in the axial direction of the rotor shaft is higher than the stress acting on the electromagnetic steel plate disposed in the central portion, the electromagnetic steel plates having high strength receive the stress, which makes it possible to endure the stress.

According to the aspect above, the electromagnetic steel plates may include a first electromagnetic steel plate and a second electromagnetic steel plate that is thicker than the first electromagnetic steel plate. The first electromagnetic steel plate may be disposed in the central portion of the rotor core in the axial direction of the rotor shaft, and the second electromagnetic steel plate may be disposed in each of the end portions of the rotor core in the axial direction of the rotor shaft.

With the configuration above, the second electromagnetic steel plates thicker than the first electromagnetic steel plate are disposed in the respective end portions of the rotor core in the axial direction of the rotor shaft such that the first electromagnetic steel plate disposed in the central portion of the rotor core in the axial direction of the rotor shaft is interposed between the second electromagnetic steel plates. Therefore, the second electromagnetic steel plates disposed in the respective end portions of the rotor core in the axial direction of the rotor shaft have higher strength than that of the first electromagnetic steel plate disposed in the central portion. Therefore, although the stress acting on the second electromagnetic steel plates disposed in the end portions in the axial direction of the rotor shaft is higher than the stress acting on the first electromagnetic steel plate disposed in the central portion, the second electromagnetic steel plates having higher strength than that of the first electromagnetic steel plate receive the stress, which makes it possible to endure the stress.

According to the aspect above, the second electromagnetic steel plates may each include a through hole at the same position in a state where the rotor core is assembled to the rotor shaft, the through hole penetrating the second electromagnetic steel plates in the axial direction of the rotor shaft.

With the configuration above, the through holes penetrating the second electromagnetic steel plates in the axial direction of the rotor shaft are provided in the respective second electromagnetic steel plates at the same position in the state where the rotor core is assembled to the rotor shaft. Therefore, whether the electromagnetic steel plates are erroneously assembled to the rotor shaft can be checked by inserting a pin into the hole constituted by the through holes after assembly.

According to the aspect above, in the state where the rotor core is assembled to the rotor shaft, holes may be provided in the end portions of the rotor core in the axial direction of the rotor shaft by the through holes at the same position in a circumferential direction of the rotor core.

With the configuration above, in the state where the rotor core is assembled to the rotor shaft, holes provided in the end portions of the rotor core in the axial direction of the rotor shaft are provided at the same position in the circumferential direction of the rotor core. Therefore, the shape of the rotor core is symmetrical in the right-left direction with respect to the central portion in the axial direction of the rotor shaft.

Therefore, eccentricity generated while the rotor is rotating caused by asymmetricity of the rotor core in the right-left direction is suppressed.

According to the aspect above, the electromagnetic steel plate may include a housing hole for housing a magnet, and the through hole may be provided on an inner peripheral side in a radial direction of the electromagnetic steel plate with respect to the housing hole.

With the configuration above, the through hole is provided on the inner peripheral side with respect to the housing hole that is provided in the electromagnetic steel plate and houses the magnet, which suppresses hindering the magnetic flux generated around the magnet.

According to the aspect above, a key provided in one of the electromagnetic steel plate and the rotor shaft may be fitted to a key groove provided in the other of the electromagnetic steel plate and the rotor shaft such that a relative rotation between the electromagnetic steel plate and the rotor shaft is restricted. The through hole may be provided at a position distant from the key or the key groove provided in the second electromagnetic steel plate by a predetermined angle in the circumferential direction.

With the configuration above, the through hole provided in the second electromagnetic steel plate is provided at a position distant from the key or the key groove provided in the second electromagnetic steel plate by a predetermined angle in the circumferential direction. Consequently, although the stress is increased around the portion of the second electromagnetic steel plate where the key or the key groove is provided, degradation of the strength of the second electromagnetic steel plate caused by providing the through hole in proximity to the key or the key groove can be suppressed because the through hole is provided at a position distant from the key or the key groove.

According to the aspect above, the rotor core may include at least three types of the electromagnetic steel plates. The strength of the electromagnetic steel plate disposed closer to the end portion in the axial direction of the rotor shaft may be increased.

With the configuration above, the rotor core is composed of at least three types of electromagnetic steel plates, and the strength is increased as the electromagnetic steel plates are disposed closer to the end portions of the rotor core in the axial direction of the rotor shaft. Therefore, although the stress acting on the electromagnetic steel plates disposed closer to the end portions of the rotor core in the axial direction of the rotor shaft increases, the high stress can be appropriately endured.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the disclosure will be described in detail with reference to the drawings. Note that, in the following embodiments, the drawings are appropriately simplified or modified, and the dimensional ratios and shapes of the respective parts are not necessarily drawn accurately.

First Embodiment

Figure 1:
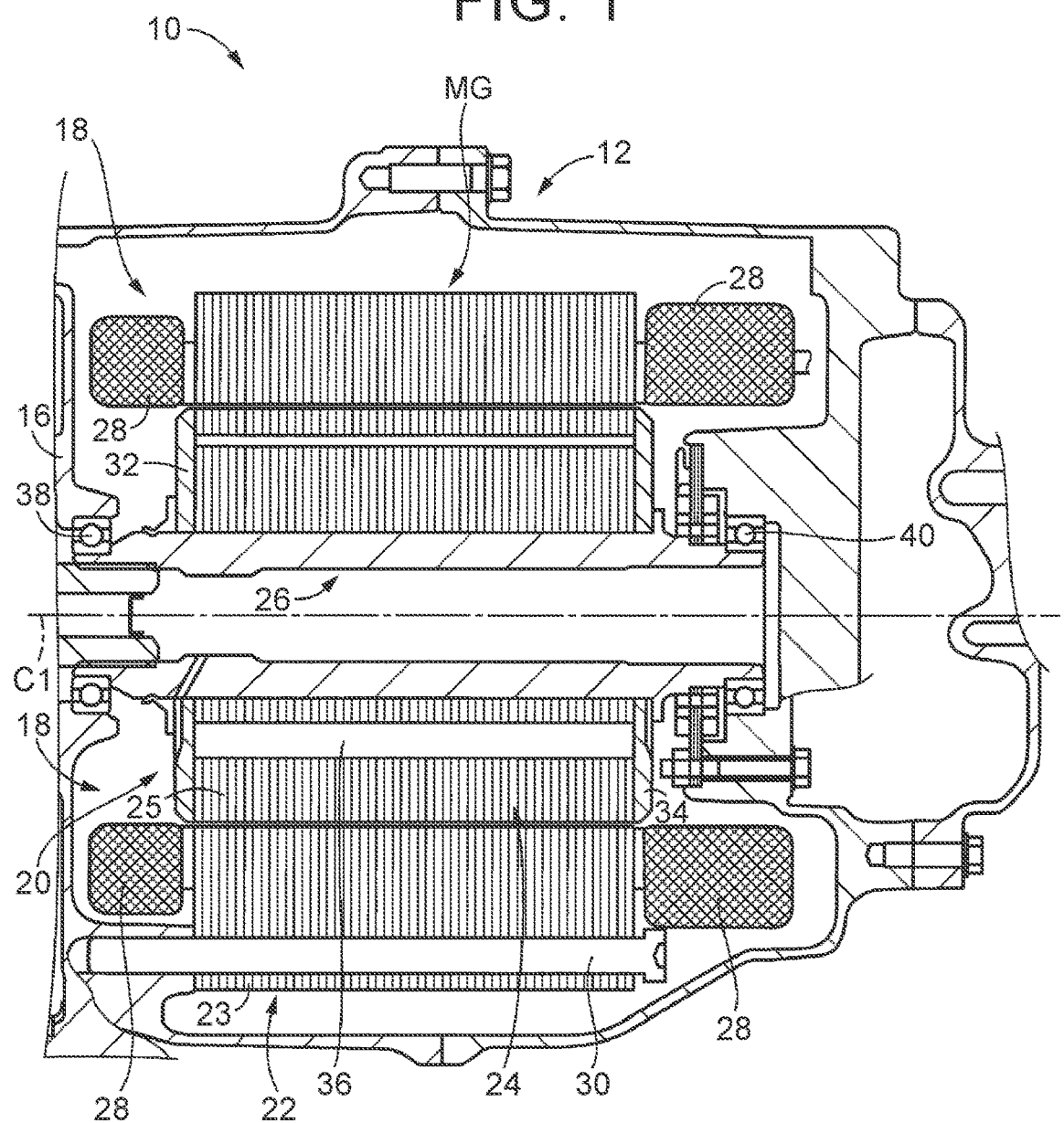
FIG. 1 is a sectional view showing a part of a vehicle drive device provided in a vehicle to which the disclosure is applied.

FIG. 1 is a sectional view showing a part of a vehicle drive device 10 (hereinafter referred to as a drive device 10) provided in a vehicle to which the disclosure is applied. The drive device 10 is provided in, for example, an electric vehicle or a hybrid vehicle. The drive device 10 includes a rotary electric machine MG for the vehicle (hereinafter referred to as a rotary electric machine MG) in a case 12 that is a non-rotating member. The rotary electric machine MG functions as a driving force source of the vehicle.

A motor chamber 18 that is partitioned by a partition wall 16 is defined in the case 12, and the rotary electric machine MG is housed in the motor chamber 18. The rotary electric machine MG is disposed so as to be rotatable around a rotation axis C1. The rotary electric machine MG includes a cylindrical stator 22, a cylindrical rotor core 24, and a rotor shaft 26. The stator 22 is fixed to the case 12 so as not to be rotatable. The rotor core 24 is disposed on an inner peripheral side of the stator 22. The rotor shaft 26 is integrally connected to an inner periphery of the rotor core 24. The rotor core 24 and the rotor shaft 26 are integrally connected to each other such that a rotor 20 of the rotary electric machine MG is configured.

The stator 22 is configured by stacking a plurality of electromagnetic steel plates 23, each of which has a disc shape. The stator 22 is fastened to the case 12 by a plurality of bolts 30 so as not to be rotatable. The stator 22 includes coil ends 28 on respective sides of the stator 22 in a direction of the rotation axis C1 by winding a coil around the stator 22.

The rotor core 24 is disposed on the inner peripheral side of the stator 22. The rotor core 24 is configured by stacking a plurality of electromagnetic steel plates 25, each of which has a disc shape. The rotary electric machine MG includes a pair of end plates 32, 34, each of which is disposed on a corresponding one side of the sides of the rotor core 24 in the direction of the rotation axis C1. The rotor core 24 is held so as to be interposed between the end plates 32, 34. The rotor core 24 includes a built-in magnet 36.

The rotor shaft 26 has a cylindrical shape, and is supported so as to be rotatable about the rotation axis C1 by bearings 38, 40 that are disposed at respective ends of the rotor shaft 26 in the axial direction (in the direction of the rotation axis C1). The rotor core 24 is integrally fixed to an outer peripheral surface of the rotor shaft 26. The rotor 20 is configured by integrally fixing the rotor core 24 to the rotor shaft 26. The rotor 20 rotates integrally about the rotation axis C1. A structure for fixing the rotor core 24 to the rotor shaft 26 will be described later.

Next, the structure for fixing the rotor core 24 to the rotor shaft 26 will be described. As described above, the rotor core 24 is configured by stacking the electromagnetic steel plates 25 in the axial direction of the rotor shaft 26. Each of the electromagnetic steel plates 25 is fitted to the outer peripheral surface of the rotor shaft 26 in an interference fit state. Here, the rotor core 24 is composed of a plurality of blocks 50 (see FIG. 3). Each of the blocks 50 is configured as one component in a manner such that a predetermined number of the electromagnetic steel plates 25 are combined using an adhesive or by clinching. In a process of assembling the rotor core 24 to the rotor shaft 26, each block 50 is separately fitted to the rotor shaft 26.

As described above, the electromagnetic steel plates 25 constituting the rotor core 24 are fitted to the rotor shaft 26 in the interference fit state. Therefore, a stress corresponding to an interference that is set between the electromagnetic steel plates 25 and the rotor shaft 26 acts on the electromagnetic steel plates 25 and the rotor shaft 26.

Figure 2:
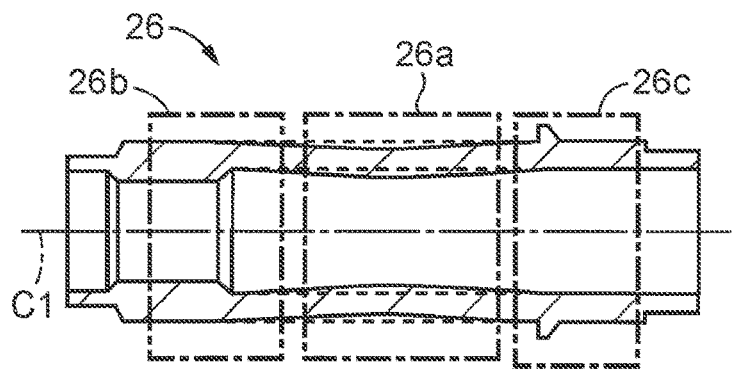
FIG. 2 shows a deflection state of a rotor shaft when electromagnetic steel plates are fitted to a rotor shaft shown in FIG. 1.

FIG. 2 shows a deflection state of the rotor shaft 26 when the electromagnetic steel plates 25 are fitted to the rotor shaft 26. Note that, FIG. 2 is a diagram for explaining the deflection state of the rotor shaft 26. Therefore, the shape and dimensions, etc. do not completely match the shape and dimensions, etc. of the rotor shaft 26 shown in FIG. 1. In FIG. 2, broken lines correspond to a state of the rotor shaft 26 before the electromagnetic steel plates 25 are fitted, and solid lines correspond to the state of the rotor shaft 26 after the electromagnetic steel plates 25 are fitted. As shown in FIG. 2, when the electromagnetic steel plates 25 are fitted to the rotor shaft 26, deflection becomes greater as the deflected portion is located close to a central portion 26a in the axial direction of the rotor shaft 26. That is, as a portion of the rotor shaft 26 is positioned closer to the central portion 26a in the axial direction of the rotor shaft 26, the rotor shaft 26 is more likely to be deflected, and a deformation amount caused by pressing of the electromagnetic steel plates 25 becomes larger. On the other hand, deflection becomes smaller in end portions 26b, 26c in the axial direction of the rotor shaft 26. That is, the rotor shaft 26 is less likely to be deflected in the end portions 26b, 26c in the axial direction of the rotor shaft 26, and the deformation amount caused by pressing of the electromagnetic steel plates 25 becomes smaller.

Figure 3:
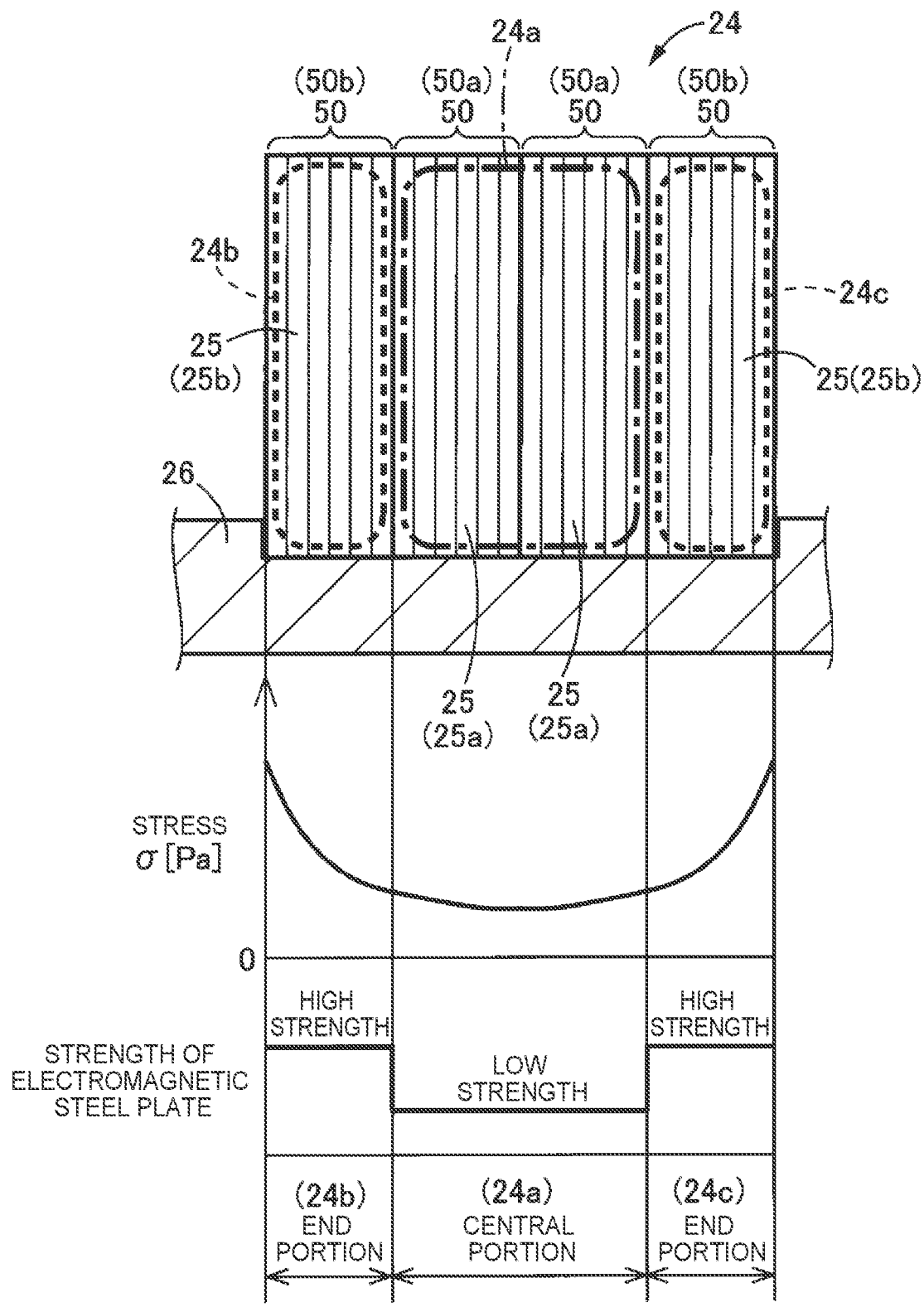
FIG. 3 shows a magnitude of a stress that acts on each electromagnetic steel plate when a rotor core is assembled to the rotor shaft shown in FIG. 1.

FIG. 3 shows a magnitude of a stress σ [Pa] that acts on each electromagnetic steel plate and strengths of the electromagnetic steel plates 25 when the rotor core 24 is assembled to the rotor shaft 26. In FIG. 3, the upper stage is a sectional view schematically showing a state where the rotor core 24 is assembled to the rotor shaft 26, the middle stage shows a magnitude of the stress σ acting on the electromagnetic steel plates 25 constituting the rotor core 24, and the lower stage shows strengths of the electromagnetic steel plates 25. Note that, the end plates 32, 34 shown in FIG. 1 are omitted in FIG. 3. Further, a sectional view of FIG. 3 shows that an inner peripheral surface of the rotor core 24 is fitted in a recess provided on the outer peripheral surface of the rotor shaft 26. However, the sectional view in FIG. 3 only shows a conceptional view of a state where the rotor core 24 and the rotor shaft 26 are fitted to each other in the interference fit state, and the recess corresponds to the deflection of the rotor shaft 26.

In FIG. 3, the rotor core 24 is composed of four blocks 50. As shown in FIG. 3, the stress σ [Pa] acting on the electromagnetic steel plates 25 that are disposed in a central portion 24a of the rotor core 24 in the axial direction of the rotor shaft 26 (hereinafter, the term "axial direction" refers to the axial direction of the rotor shaft 26, that is, the direction of the rotation axis C1 unless otherwise indicated) becomes smaller, and as the electromagnetic steel plates 25 are disposed distant from the central portion 24a and closer to the end portions 24b, 24c in the axial direction of the rotor core 24, the stress σ [Pa] acting on the electromagnetic steel plates 25 becomes larger. As described above, the reason for the above is as follows: a load (reaction force) that is applied to the electromagnetic steel plates 25 by the rotor shaft 26 becomes smaller because the deflection is more likely to occur in the central portion 26a (see FIG. 2) of the rotor shaft 26 in the axial direction; and the load (reaction force) applied to the electromagnetic steel plates 25 by the rotor shaft 26 becomes larger because the rotor shaft 26 is less likely to deflect in the portions closer to the end portions 24b, 24c of the rotor core 24 in the axial direction of the rotor shaft 26.

Here, in the structure of the related art, all of the electromagnetic steel plates 25 that are used in the structure are of the same type. In the structure above, the strength of the electromagnetic steel plates 25 used is set based on the strength capable of enduring the stress σ acting on portions where the stress σ becomes the highest in the rotor core 24, that is, the end portions 24b, 24c in the axial direction of the rotor core 24. Therefore, the electromagnetic steel plates 25 constituting the rotor core 24 are all made of high-strength material. Consequently, the quantity of the electromagnetic steel plates 25 made of the high-strength material increases, which leads to a cost increase.

On the other hand, the rotor core 24 is configured of different types of the electromagnetic steel plates 25 having different strengths in accordance with the magnitude of the stress σ that acts on the rotor core 24 in the state where the rotor core 24 is assembled to the rotor shaft 26. Specifically, as shown in the lower stage in FIG. 3, the strength of the electromagnetic steel plates 25 disposed on the end portions 24b, 24c sides in the axial direction of the rotor core 24 is set higher than the strength of the electromagnetic steel plates 25 disposed in the central portion 24a in the axial direction. Here, the strength of the electromagnetic steel plates 25 corresponds to a mechanical strength defined by, for example, a tensile strength and a magnitude of the yield point. As the strength of the electromagnetic steel plates 25 increases, the tensile strength and the yield point become higher.

Figure 4:
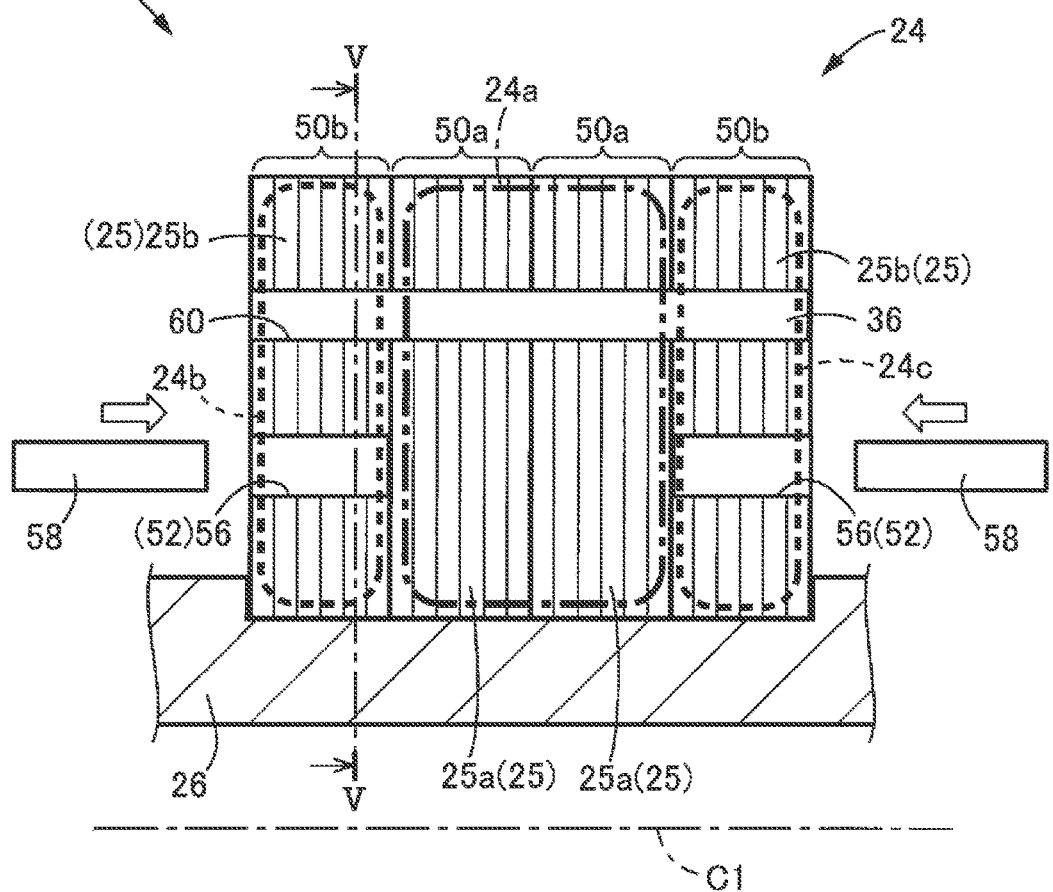
FIG. 4 is a sectional view of a rotor core in which different types of electromagnetic steel plates are used in the rotor core.

In the first embodiment, the electromagnetic steel plates 25 constituting the rotor core 24 are composed of two types of the electromagnetic steel plates 25, that is, a first electromagnetic steel plate 25a and a second electromagnetic steel plate 25b. FIG. 4 is a sectional view of the rotor core 24 that is composed of two different types of the electromagnetic steel plates 25 according to the first embodiment. As shown in FIG. 4, the rotor core 24 is composed of first blocks 50a and second blocks 50b. The first block 50a is configured by integrating a plurality of the first electromagnetic steel plates 25a in a laminated state. The second block 50b is configured by integrating a plurality of the second electromagnetic steel plates 25b in a laminated state. Here, the second electromagnetic steel plate 25b is made of a material having a higher mechanical strength than that of the first electromagnetic steel plate 25a. Therefore, the strength of the second electromagnetic steel plate 25b is made higher than the strength of the first electromagnetic steel plate 25a. The dimensions of the first electromagnetic steel plate 25a and the second electromagnetic steel plate 25b are the same.

Further, two of the first blocks 50a are disposed in the central portion 24a of the rotor core 24 in the axial direction, and one second block 50b is disposed in each of the end portions 24b, 24c of the rotor core 24 in the axial direction so as to be adjacent to the corresponding first block 50a. That is, the first electromagnetic steel plates 25a are disposed in the central portion 24a of the rotor core 24 in the axial direction, and the second electromagnetic steel plates 25b are disposed in the end portions 24b, 24c of the rotor core 24 in the axial direction.

When the electromagnetic steel plates 25 are disposed as described above, the second electromagnetic steel plates 25b having a higher strength than that of the first electromagnetic steel plates 25a are disposed in the end portions 24b, 24c in the axial direction of the rotor core 24 where the stress σ is high. Therefore, the second electromagnetic steel plates 25b receive high stress σ, which makes it possible to endure the stress σ. On the other hand, the first electromagnetic steel plate 25a having a strength lower than that of the second electromagnetic steel plate 25b is disposed in the central portion 24a of the rotor core 24 where the stress σ is lower than the stress σ in the end portions 24b, 24c. Therefore, even the first electromagnetic steel plate 25a can endure the stress σ acting on the first electromagnetic steel plate 25a. In this connection, the quantity of the second electromagnetic steel plates 25b made of a high-strength material can be reduced, as compared with the case where all the electromagnetic steel plates 25 are configured of the second electromagnetic steel plates 25b.

Here, the rotor core 24 is composed of the electromagnetic steel plates of different types, that is, the first electromagnetic steel plate 25a and the second electromagnetic steel plate 25b, and thus erroneous assembly may occur. For example, when the first electromagnetic steel plates 25a are erroneously assembled to the end portions 24b, 24c of the rotor core 24, there is a possibility that durability of the rotor core 24 may be degraded as the high stress σ acts on the first electromagnetic steel plates 25a. In order to eliminate such erroneous assembly, each of the second electromagnetic steel plates 25b is provided with a through hole 52 penetrating the second electromagnetic steel plate 25b in the axial direction of the rotor shaft 26 at the same position in the state where the rotor core 24 is assembled to the rotor shaft 26. The through holes 52 are pierced when the second electromagnetic steel plates 25b are processed by pressing.

Therefore, when the second electromagnetic steel plates 25b are normally assembled, holes 56 that extend in the axial direction are provided in the end portions 24b, 24c in the axial direction of the rotor core 24. Each hole 56 extends up to a position adjacent to the first block 50a. Therefore, after the rotor core 24 is assembled to the rotor shaft 26, whether the second blocks 50b (second electromagnetic steel plates 25b) are normally assembled can be checked by inserting pins 58 into the holes 56 from respective sides of the rotor core 24 in the axial direction of the rotor core 24. The through holes 52 are pierced when the second electromagnetic steel plates 25b are processed by pressing.

When the second block 50b (second electromagnetic steel plate 25b) is normally assembled to the rotor shaft, the pin 58 can be inserted into the hole 56 up to a predetermined depth (the depth at which the tip of the pin 58 contacts the first block 50a). On the other hand, for example, when the first block 50a is erroneously assembled at the position where the second block 50b should be assembled, the pin 58 cannot be inserted through. Therefore, erroneous assembly can be detected. Further, in FIG. 4, one second block 50b is assembled to each of the end portions 24b, 24c in the axial direction of the rotor core 24. However, even when two or more second blocks 50b are assembled to each of the end portions 24b, 24c, erroneous assembly can be detected by inserting the pin 58 into the hole 56. That is, even when one or more second blocks 50b are assembled, erroneous assembly can be detected by checking whether the pin 58 can be inserted up to a depth that corresponds to the number of the second blocks 50b. Further, even when the first electromagnetic steel plate 25a is mixed in the second electromagnetic steel plates 25b in the process of assembling the second block 50b, the pin 58 cannot be inserted into the hole 56 up to a predetermined depth after assembly. Therefore, erroneous assembly can be detected.

Further, the holes 56 are provided in the end portions 24b, 24c in the axial direction of the rotor core 24 at the same position in a circumferential direction of the rotor core 24 in the state where the rotor core is assembled to the rotor shaft. That is, the holes 56 are provided in the end portions 24b, 24c in the axial direction of the rotor core 24 at positions that are symmetrical in a right-left direction with respect to the center of the rotor core 24 in the axial direction, which reduces eccentricity generated when the rotor 20 rotates.

Further, the electromagnetic steel plate 25 is provided with a housing hole 60 for accommodating the magnet 36. The hole 56 is located on the inner peripheral side by a predetermined value L with respect to the housing hole 60 in a radial direction of the second electromagnetic steel plate 25b (that is, the hole 56 is provided on a radially inner side by the predetermined value L with respect to the housing hole 60). The magnet 36 is housed in the housing hole 60. Therefore, magnetic flux is generated around the magnet 36. In this regard, the hole 56 is provided on the inner peripheral side by the predetermined value L with respect to the housing hole 60, which suppresses hindering the magnetic flux. Accordingly, performance degradation of the rotary electric machine MG is suppressed. The predetermined value L is obtained experimentally or by design in advance, and is set to a value that does not hinder the magnetic flux generated around the magnet 36 and suppresses performance deterioration of the rotary electric machine MG.

Figure 5:
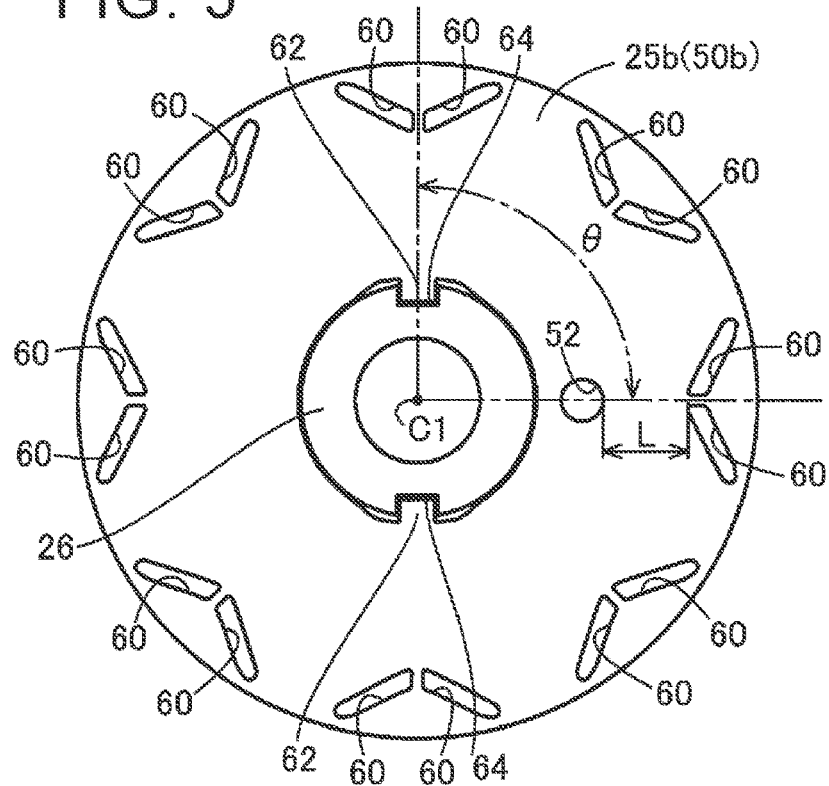
FIG. 5 is a sectional view of a second block and the rotor shaft shown in FIG. 4 taken along a sectional line V.

Further, the through hole 52 is provided at a position distant from a key 62 provided in the second electromagnetic steel plate 25b by a predetermined angle in the circumferential direction of the second electromagnetic steel plate 25b. FIG. 5 is a sectional view of the second block 50b and the rotor shaft 26 shown in FIG. 4 taken along a sectional line V. As shown in FIG. 5, a pair of keys 62 is provided on an inner peripheral portion of the second electromagnetic steel plate 25b. The keys 62 protrude toward an inner periphery of the second electromagnetic steel plate 25b from respective two locations. The keys 62 are provided at positions displaced from each other by 180 degrees in the circumferential direction. Further, a key groove 64 is provided on the outer peripheral surface of the rotor shaft 26 at a position where the key 62 is fitted into the key groove 64 in the state where the rotor core 24 is assembled to the rotor shaft 26. When the key 62 and the key groove 64 are fitted to each other, relative rotation between the rotor shaft 26 and the rotor core 24 is restricted.

The stress σ acting on the electromagnetic steel plate 25 becomes high around the portion where the key 62 is fitted to the key groove 64. In this regard, the through hole 52 is provided in the second electromagnetic steel plate 25b at a position distant from the position where the key 62 is provided in the second electromagnetic steel plate 25b by a predetermined angle θ in the circumferential direction. For example, the through hole 52 is provided at a position that is distant by 90 degrees in the circumferential direction from the positions in the second electromagnetic steel plate 25b where the keys 62 are provided. As described above, the through hole 52 is provided at the position distant from the keys 62 such that degradation of the strength around the keys 62 in the second electromagnetic steel plate 25b can be suppressed. Consequently, degradation of durability of the second electromagnetic steel plate 25b caused by the high stress σ acting around the keys 62 in the second electromagnetic steel plate 25b can be suppressed. The predetermined angle θ is obtained experimentally or by design in advance, and is set to a value that does not affect the strength around the keys 62 or a value that allows the strength around the keys 62 to withstand the stress G.

As described above, according to the first embodiment, the strength of the second electromagnetic steel plates 25b disposed in the end portions 24b, 24c of the rotor core 24 in the axial direction is higher than that of the first electromagnetic steel plate 25a disposed in the central portion 24a. As described above, in the state where the rotor core 24 is assembled to the rotor shaft 26, the stress σ acting on the second electromagnetic steel plates 25b disposed in the end portions 24b, 24c becomes higher than the stress σ acting on the first electromagnetic steel plates 25a disposed in the central portion 24a. However, the second electromagnetic steel plates 25b having high strength are disposed in the end portions 24b, 24c such that the stress σ acting on the end portions 24b, 24c can be endured. Accordingly, the reliability of the rotor core 24 is maintained. Further, the first electromagnetic steel plates 25a having a lower strength than that of the second electromagnetic steel plates 25b are disposed in the central portion 24a of the rotor core 24 in consideration that the stress σ acting on the central portion 24a is small, which can reduce the use quantity of the high strength second electromagnetic steel plates 25b as a whole of the rotor core 24.

Further, according to the first embodiment, in the state where the rotor core 24 is assembled to the rotor shaft 26, the through holes 52 penetrating the second electromagnetic steel plates 25b in the axial direction of the rotor shaft 26 are provided in the respective second electromagnetic steel plates 25b at the same position in the circumferential direction. With this configuration, whether the electromagnetic steel plates 25 are erroneously assembled to the rotor shaft 26 can be checked by inserting the pins 58 into the holes 56 constituted by the through holes 52 after assembly. Further, in the state where the rotor core 24 is assembled to the rotor shaft 26, the holes 56 constituted by the through holes 52 are provided in the end portions 24b, 24c of the rotor core 24 at the same position in the circumferential direction of the rotor core 24. Therefore, the shape of the rotor core 24 is symmetrical in the right-left direction with respect to the central portion in the axial direction of the rotor shaft 26. Therefore, eccentricity generated while the rotor 20 is rotating caused by asymmetricity of the rotor core 24 in the right-left direction is suppressed. Further, the through hole 52 is provided on the inner peripheral side with respect to the housing hole 60 that is provided in the second electromagnetic steel plate 25b and houses the magnet 36, which suppresses hindering the magnetic flux generated around the magnet 36. The through hole 52 is provided in the second electromagnetic steel plate 25b at the position distant from the position where the keys 62 are provided in the second electromagnetic steel plate 25b by the predetermined angle θ in the circumferential direction. Consequently, although the stress σ becomes high around the portions of the second electromagnetic steel plate 25b where the keys 62 are provided, the through hole 52 is provided at the position distant from the keys 62 such that degradation of the strength of the second electromagnetic steel plate 25*b* caused by providing the through hole 52 in proximity to the keys 62 can be suppressed.

Next, a second embodiment of the disclosure will be described. In the following description, the same parts as those in the embodiment described above will be designated by the same reference signs and the description thereof will be omitted.

Second Embodiment

Figure 6:
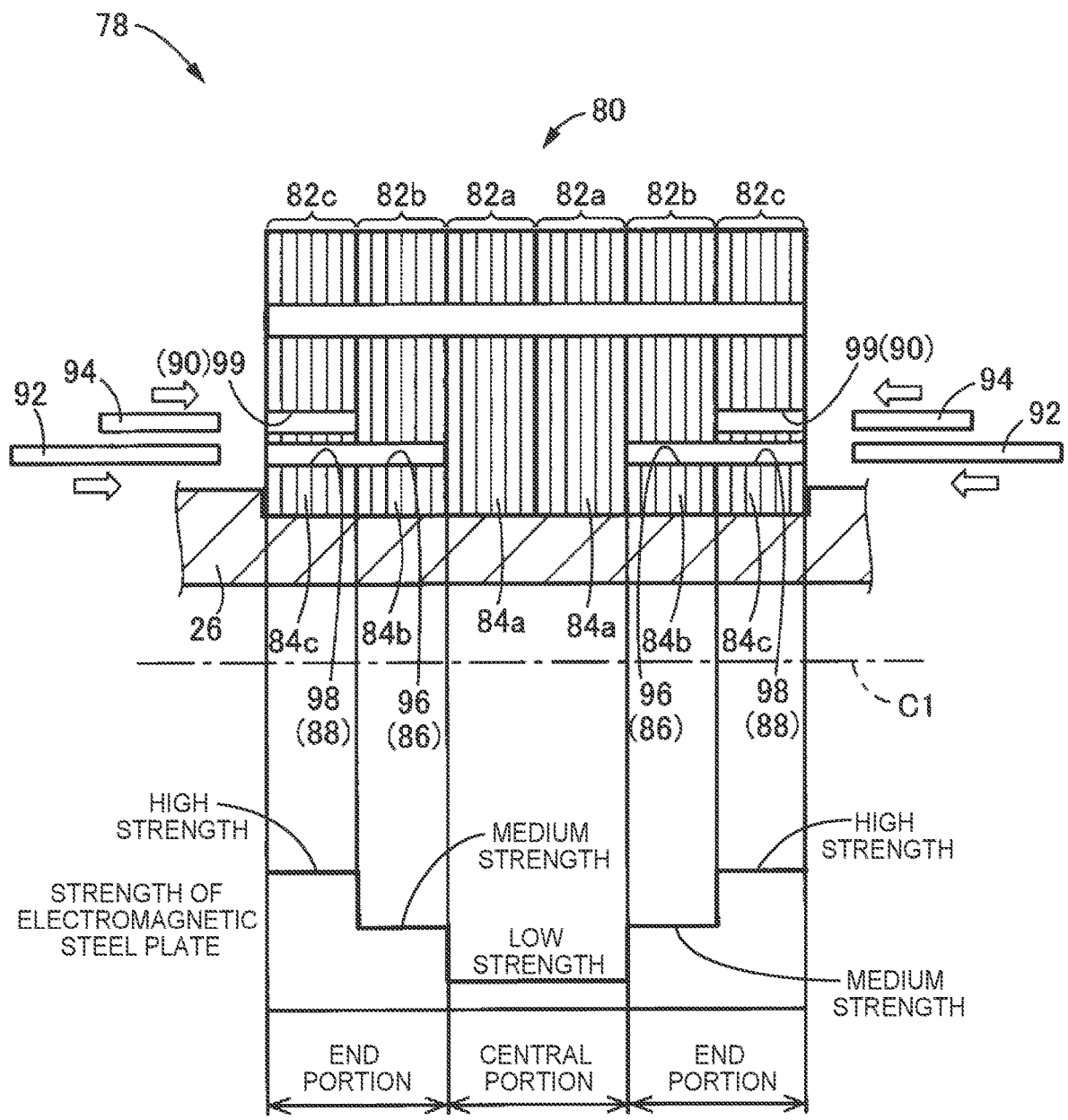
FIG. 6 is a sectional view of a rotor core and the rotor shaft according to a second embodiment of the disclosure.

FIG. 6 is a sectional view of a rotor core 80 and the rotor shaft 26 according to a second embodiment of the disclosure. The rotor core 80 is integrally fitted to the outer peripheral surface of the rotor shaft 26 such that a rotor 78 is configured. In the second embodiment, the rotor core 80 is composed of three types of blocks, that is, a first block 82*a*, a second block 82*b*, and a third block 82*c*. The first block 82*a* is configured as a member in which a plurality of first electromagnetic steel plates 84*a* are laminated. The second block 82*b* is configured as a member in which a plurality of second electromagnetic steel plates 84*b* are laminated. The third block 82*c* is configured as a member in which a plurality of third electromagnetic steel plates 84*c* are laminated. In other words, the electromagnetic steel plates 84 are composed of three types of the electromagnetic steel plates 84, that is, the first electromagnetic steel plate 84*a* to the third electromagnetic steel plate 84*c* made of different materials from each other. Here, the strength of the second electromagnetic steel plate 84*b* is designed to be higher than the strength of the first electromagnetic steel plate 84*a*, and the strength of the third electromagnetic steel plate 84*c* is designed to be higher than the strength of the second electromagnetic steel plate 84*b*. Therefore, the third electromagnetic steel plates 84*c* have the highest strength, the second electromagnetic steel plates 84*b* have the second highest strength, and the first electromagnetic steel plates 84*a* have the lowest strength. Also in the second embodiment, the first electromagnetic steel plates 84*a*, the second electromagnetic steel plates 84*b*, and the third electromagnetic steel plates 84*c* are all fitted to the rotor shaft 26 in the interference fit state.

Further, in the rotor core 80, the first blocks 82*a* are disposed in the central portion in the axial direction of the rotor shaft 26, and the second blocks 82*b* and the third blocks 82*c* are disposed in this order toward the respective end portions in the axial direction of the rotor shaft 26. That is, as shown in the lower stage in FIG. 6, the strength of the electromagnetic steel plates 84 disposed closer to the respective end portions of the rotor core 80 with respect to the central portion in the axial direction of the rotor shaft 26 is designed to be higher. Therefore, in the rotor core 80, the stress σ acting on the electromagnetic steel plates 84 becomes higher as the electromagnetic steel plates 84 are located closer to the respective end portions in the axial direction of the rotor shaft 26. However, the electromagnetic steel plates 84 having higher strength (the third electromagnetic steel plates 84*c*, the second electromagnetic steel plates 84*b*) are disposed in the portions closer to the end portions such that the high stress can be endured.

Further, first through holes 86 are provided in the respective second electromagnetic steel plates 84*b*. A second through hole 88 and a third through hole 90 are provided in each of the third electromagnetic steel plates 84*c*. Here, the first through hole 86 and the second through hole 88 are designed to be provided at the same position in the circumferential direction when the second electromagnetic steel plate 84*b* and the third electromagnetic steel plate 84*c* are assembled to the rotor shaft 26. The first through hole 86 and the second through hole 88 have the same diameter (inner diameter). With this configuration, the second block 82*b* includes a first hole 96 constituted by the first through holes 86. Further, the third block 82*c* includes a second hole 98 constituted by the second through holes 88 and a third hole 99 constituted by the third through holes 90. The first through hole 86, the second through hole 88, and the third through hole 90 each correspond to a through hole of the disclosure, and the first hole 96, the second hole 98, and the third hole 99 each correspond to a hole of the disclosure.

With the configuration above, when a first pin 92 is inserted into the second hole 98 provided in the third block 82*c* after the assembly, the first pin 92 is inserted through the second hole 98 of the third block 82*c* and reaches up to the bottom of the first hole 96 of the second block 82*b* when the rotor core 80 is normally assembled to the rotor shaft 26. Consequently, erroneous assembly can be detected based on whether the tip of the first pin 92 reaches the bottom of the first hole 96.

On the other hand, when the second block 82*b* is erroneously assembled at the position where the third block 82*c* should be assembled, the first pin 92 still can be inserted up to a normal position. Therefore, erroneous assembly cannot be detected using the first pin 92. In this regard, erroneous assembly can be detected by inserting a second pin 94 into the third hole 99 provided in the third block 82*c*.

As described above, even when the rotor core 80 is composed of three types of electromagnetic steel plates 84, the same effect as that of the first embodiment described above can be obtained as well. Similarly, even when the rotor core is composed of four or more types of electromagnetic steel plates, the strength is increased as the electromagnetic steel plates are disposed at positions closer to the respective end portions of the rotor core with respect to the central portion of the rotor core in the axial direction of the rotor shaft, which makes it possible to obtain the same effect as that of the first embodiment described above.

Further, even when the rotor core is composed of three or more types of electromagnetic steel plates, erroneous assembly can be detected by appropriately setting through holes for each type of the electromagnetic steel plate. For example, the through hole is not provided in the electromagnetic steel plate having the lowest strength, and one through hole is provided in the electromagnetic steel plate having higher strength than the electromagnetic steel plate having the lowest strength. Further, two through holes are provided in the electromagnetic steel plate having a higher strength than the strength of the electromagnetic steel plate including one through hole, and one of the two through holes is provided at the same position as the position of the hole in the electromagnetic steel plate having a lower strength in the state where the rotor core is assembled to the rotor shaft. As described above, as the strength of the electromagnetic steel plate increases, the electromagnetic steel plate has a larger number of the through holes. Each of the through holes except for one through hole is provided at the same position as the position of the through hole in the electromagnetic steel plate having a lower strength in the state the rotor core is assembled to the rotor shaft. With the configuration of the through holes as described above, erroneous assembly can be detected based on whether the pin can be inserted through each hole and reach up to the predetermined depth of the hole by inserting the pin into each hole provided in the rotor core after assembly.

Third Embodiment

In the embodiments above, the strength of the electromagnetic steel plates is varied by changing the material constituting the electromagnetic steel plates. However, in a third embodiment, the strength of the electromagnetic steel plates is varied by changing a thickness of the electromagnetic steel plates. Specifically, electromagnetic steel plates 108 constituting a rotor core 102 according to the third embodiment are composed of a first electromagnetic steel plate 108a and a second electromagnetic steel plate 108b having different thicknesses from each other.

Figure 7:
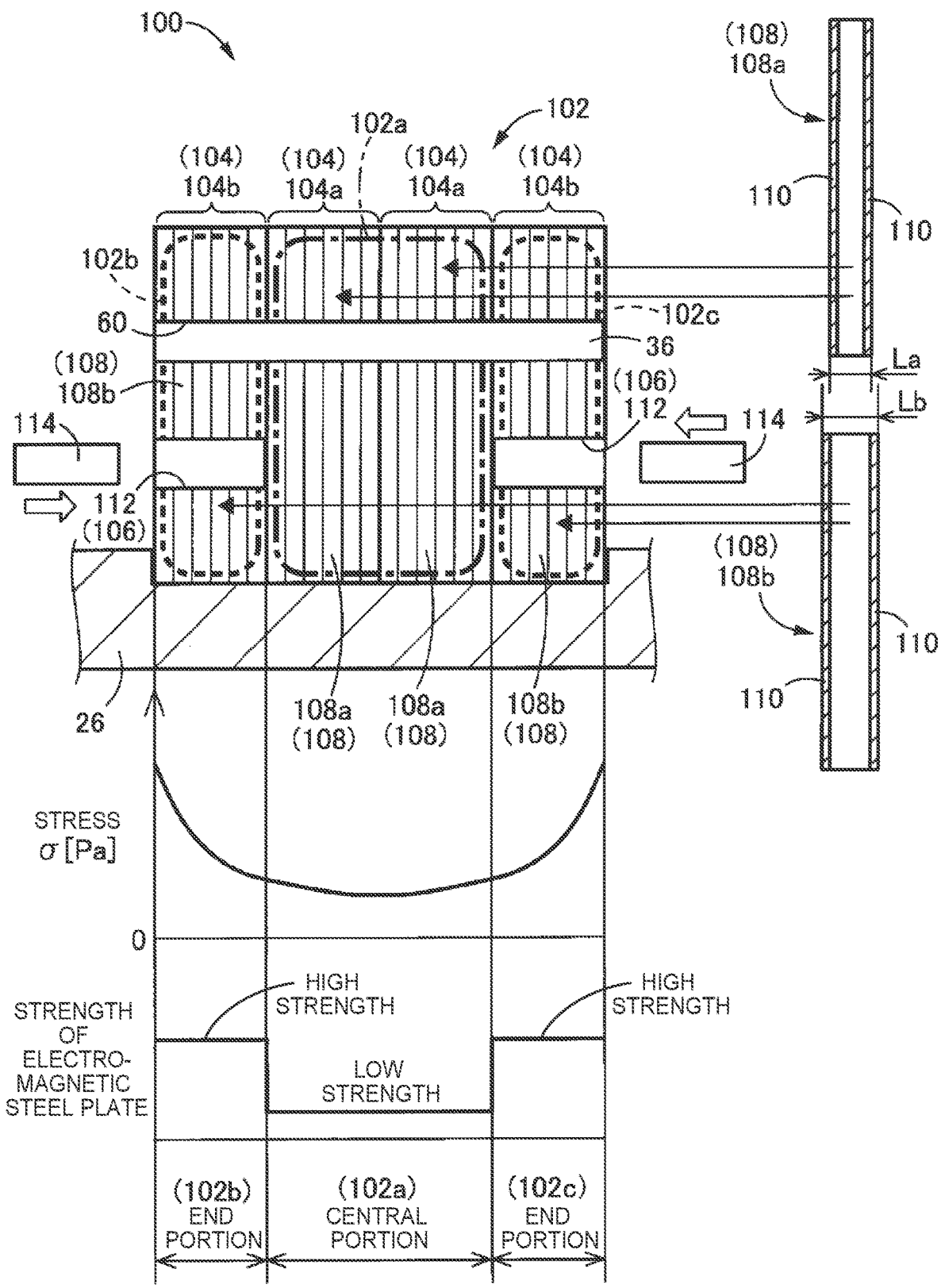
FIG. 7 is a sectional view of a rotor core and the rotor shaft according to a third embodiment of the disclosure.

FIG. 7 is a sectional view of the rotor shaft 26 and a rotor core 102 according to the third embodiment of the disclosure. The rotor core 102 is integrally fixed to the outer peripheral surface of the rotor shaft 26. Also in the third embodiment, the rotor core 102 is fitted to the rotor shaft 26 in the interference fit state. A rotor 100 is configured of the rotor shaft 26 and the rotor core 102 fitted to the outer peripheral surface of the rotor shaft 26. In the third embodiment, the rotor core 102 is composed of two types of blocks 104, that is, a first block 104a and a second block 104b. Two first blocks 104a are disposed in a central portion 102a located at the center of the rotor core 102 in the axial direction of the rotor shaft 26. One second block 104b is disposed in each of end portions 102b, 102c located at respective ends of the rotor core 102 in the axial direction of the rotor shaft 26.

The first block 104a is configured by integrating a plurality of first electromagnetic steel plates 108a in a laminated state. Further, the second block 104b is configured by integrating a plurality of second electromagnetic steel plates 108b in a laminated state. The first block 104a and the second block 104b are integrally fixed with an adhesive or by clinching, for example, respectively. As described above, the electromagnetic steel plate 108 constituting the rotor core 102 is composed of the first electromagnetic steel plate 108a and the second electromagnetic steel plate 108b. Further, in the rotor core 102, the first electromagnetic steel plates 108a are disposed in the central portion 102a located at the center in the axial direction of the rotor shaft 26, and the second electromagnetic steel plates 108b are disposed in the respective end portions 102b, 102c located at the respective ends in the axial direction of the rotor shaft 26.

In FIG. 7, the upper stage on the right side in the drawing shows a sectional shape of the first electromagnetic steel plate 108a, and the lower stage on the right side in the drawing shows a sectional shape of the second electromagnetic steel plate 108b. The surfaces of the first electromagnetic steel plate 108a and the second electromagnetic steel plate 108b are each coated with an insulator 110. In the third embodiment, the first electromagnetic steel plate 108a and the second electromagnetic steel plate 108b are made of the same material.

Further, as shown on the right side in FIG. 7, a thickness Lb of the second electromagnetic steel plate 108b is thicker than a thickness La of the first electromagnetic steel plate 108a. In other words, an axial length Lb in a state where the second electromagnetic steel plate 108b is fitted to the rotor shaft 26 is longer than an axial length La in a state where the first electromagnetic steel plate 108a is fitted to the rotor shaft 26 (Lb>La). Therefore, the electromagnetic steel plate 108 constituting the rotor core 102 is composed of the first electromagnetic steel plate 108a and the second electromagnetic steel plate 108b that is thicker than the first electromagnetic steel plate 108a.

With this configuration, the second electromagnetic steel plate 108b has more portions made of a metal material as compared with the first electromagnetic steel plate 108a. Therefore, the second electromagnetic steel plate 108b has a higher strength than that of the first electromagnetic steel plate 108a. Consequently, as shown in the lower stage of FIG. 7, the strength of the second electromagnetic steel plates 108b disposed in the respective end portions 102b, 102c of the rotor core 102 is higher than the strength of the first electromagnetic steel plate 108a disposed in the central portion 102a of the rotor core 102. The strength referred herein corresponds to the strength based on a change in the rigidity of the entire electromagnetic steel plate 108 due to a change in the thickness of the electromagnetic steel plate 108. Therefore, although the stress σ acting on the electromagnetic steel plate 108 increases from the central portion 102a of the rotor core 102 toward the end portions 102b, 102c in the axial direction of the rotor shaft 26, the second electromagnetic steel plates 108b disposed on end portions 102b, 102c sides can receive the stress σ, which makes it possible to endure the stress σ. Further, the stress σ acting on the electromagnetic steel plate 108 is small in the central portion 102a of the rotor core 102. Therefore, the first electromagnetic steel plate 108a that is thinner than the second electromagnetic steel plate 108b is disposed in the central portion 102a, thereby reducing the quantity of the first electromagnetic steel plates 108a used as the entire rotor core 102. Further, it is possible to avoid a configuration in which all of the first electromagnetic steel plates 108a and the second electromagnetic steel plates 108b are made of a high-strength material.

Further, also in the third embodiment, in order to suppress erroneous assembly of the electromagnetic steel plate 108, the second electromagnetic steel plates 108b have through holes 106 penetrating the second electromagnetic steel plate 108b in the axial direction of the rotor shaft 26 at the same position in the circumferential direction in the state where the second electromagnetic steel plates 108b are assembled to the rotor shaft 26. Therefore, in a state where the rotor core 102 is normally assembled, holes 112 parallel to the axial direction of the rotor shaft 26 are provided in the respective end portions 102b, 102c of the rotor core 102. Therefore, after the rotor core 102 is assembled to the rotor shaft 26, whether the second blocks 104b are normally assembled can be checked by inserting pins 114 into the holes 112 from respective sides of the rotor core 102 in the axial direction of the rotor core 102. Further, the holes 112 provided in the respective ends portions 102b, 102c of the rotor core 102 are provided at the same positions in the circumferential direction of the rotor core 102. That is, the holes 112 provided in the respective end portions 102b, 102c are provided at symmetrical positions in a right-to-left direction about the central portion 102a in the axial direction of the rotor core 102. With this configuration, the symmetry of the rotor core 102 is maintained, and an eccentricity generated when the rotor 100 rotates is reduced.

Further, the through hole 106 is provided on the inner peripheral side in the radial direction of the electromagnetic steel plate 108 with respect to the housing hole 60 provided for housing the magnet 36. Further, as in FIG. 5 in the first embodiment above, the through hole 106 is provided at a position distant by a predetermined angle (e.g. 90 degrees) in the circumferential direction from the position where a key of the second electromagnetic steel plate 108b (not shown in the third embodiment) is provided.

As described above, according to the third embodiment, the electromagnetic steel plate 108 constituting the rotor core 102 is composed of the first electromagnetic steel plate 108a and the second electromagnetic steel plate 108b having different thicknesses from each other. The thickness Lb of the second electromagnetic steel plates 108b disposed in the end portions 102b, 102c of the rotor core 102 is thicker than the thickness La of the first electromagnetic steel plates 108a disposed in the central portion 102a of the rotor core 102. Therefore, the strength of the second electromagnetic steel plates 108b disposed in the respective end portions 102b, 102c is higher than the strength of the first electromagnetic steel plates 108a disposed in the central portion 102a. Therefore, although the stress σ acting on the second electromagnetic steel plates 108b disposed on the end portions 102b, 102c sides in the axial direction of the rotor shaft 26 is larger than the stress σ acting on the first electromagnetic steel plates 108a disposed in the central portion 102a, the stress σ acting on the second electromagnetic steel plates 108b can be endured.

Fourth Embodiment

Figure 8:
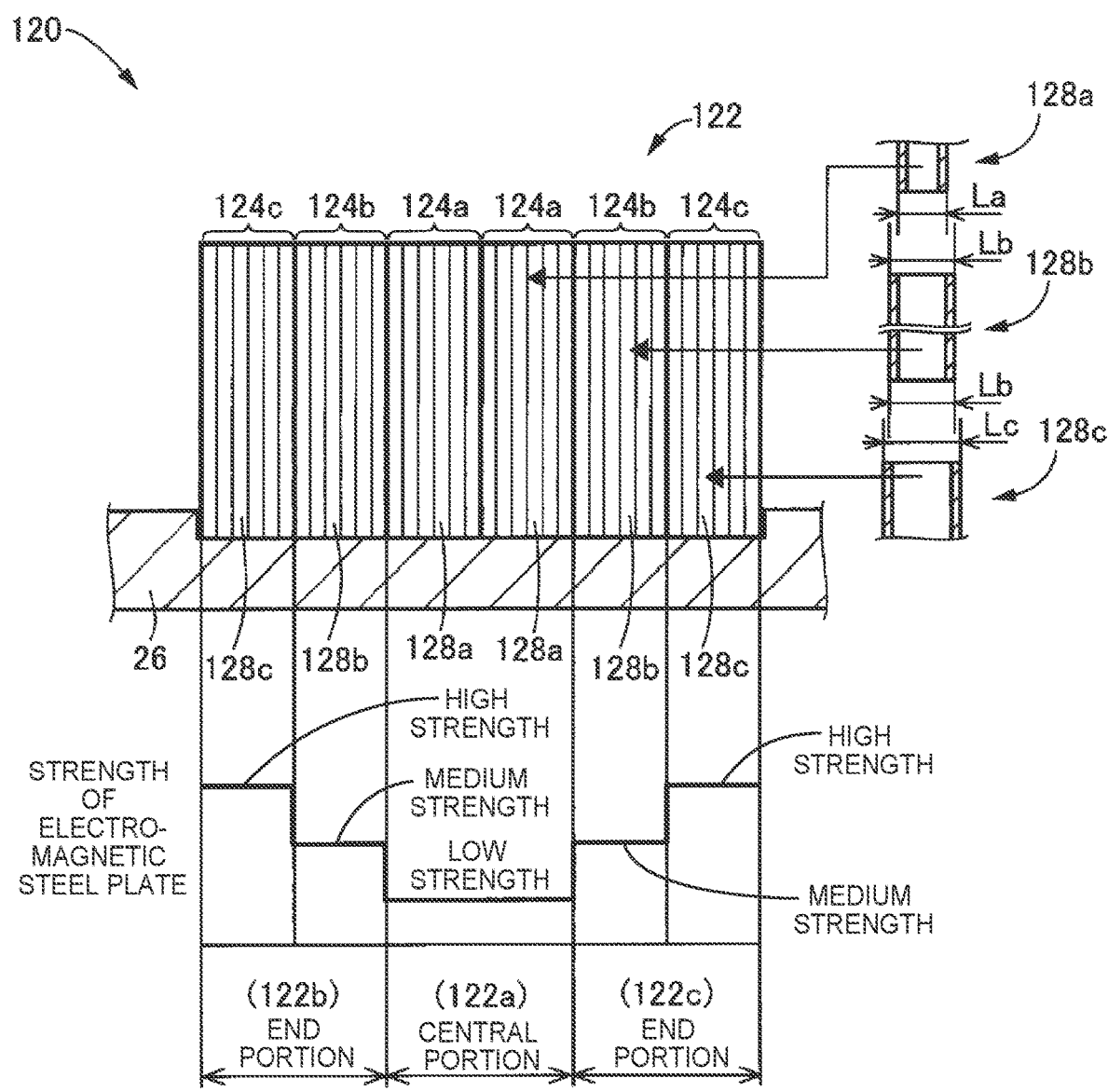
FIG. 8 is a sectional view of a rotor core and the rotor shaft according to a fourth embodiment of the disclosure.

In the third embodiment described above, the electromagnetic steel plate 108 is composed of two types of the electromagnetic steel plates, that is, the first electromagnetic steel plate 108a and the second electromagnetic steel plate 108b having different thicknesses from each other. However, in a fourth embodiment, the electromagnetic steel plate 128 is composed of three types of electromagnetic steel plates, that is, a first electromagnetic steel plate 128a to a third electromagnetic steel plate 128c having different thicknesses from each other. FIG. 8 is a sectional view of a rotor shaft 26 and a rotor core 122 according to the fourth embodiment of the disclosure. The rotor core 122 is fitted to the outer peripheral surface of the rotor shaft 26 in the interference fit state. A rotor 120 is configured of the rotor shaft 26 and the rotor core 122 fitted to the outer peripheral surface of the rotor shaft 26. As shown in FIG. 8, the rotor core 122 is composed of three types of blocks, that is, a first block 124a, a second block 124b, and a third block 124c.

The first block 124a is disposed in a central portion 122a located at the center of the rotor core 122 in the axial direction of the rotor shaft 26. The second block 124b and the third block 124c are disposed in respective end portions 122b, 122c located at respective ends of the rotor core 122 in the axial direction of the rotor shaft 26. Further, in the end portions 122b, 122c, the third blocks 124c are disposed on the sides distant from the central portion 122a in the axial direction of the rotor shaft 26 with respect to the second blocks 124b. That is, the first block 124a, the second block 124b, and the third block 124c are disposed in this order from the central portion 122a toward the respective end portions 122b, 122c in the axial direction of the rotor shaft 26.

The first block 124a is configured by integrating a plurality of first electromagnetic steel plates 128a in a laminated state. The second block 124b is configured by integrating a plurality of second electromagnetic steel plates 128b in a laminated state. The third block 124c is configured by integrating a plurality of third electromagnetic steel plates 128c in a laminated state. As described above, the electromagnetic steel plate 128 constituting the rotor core 122 is composed of the first electromagnetic steel plates 128a to the third electromagnetic steel plates 128c.

As shown on the right side in FIG. 8, a thickness Lc of the third electromagnetic steel plate 128c is thicker than a thickness La of the first electromagnetic steel plate 128a and a thickness Lb of the second electromagnetic steel plate 128b (Lc>La, Lb). Further, the thickness Lb of the second electromagnetic steel plate 128b is thicker than the thickness La of the first electromagnetic steel plate 128a (Lb>La). Therefore, the thickness Lc of the third electromagnetic steel plate 128c is the thickest, the thickness Lb of the second electromagnetic steel plate 128b is the second thickest, and the thickness La of the first electromagnetic steel plate 128a is the thinnest (Lc>Lb>La). Accordingly, the thickness of the electromagnetic steel plates 128 is increased from the central portion 122a toward the respective end portions 122b, 122c in the axial direction of the rotor shaft 26. Note that, the thickness of the electromagnetic steel plate 128 corresponds to the length of the electromagnetic steel plate 128 in the axial direction of the rotor shaft 26 in a state where the electromagnetic steel plate 128 is fitted to the rotor shaft 26.

In relation to this, as shown in the lower stage in FIG. 8, the strength of the third electromagnetic steel plates 128c constituting the third block 124c is the highest (high strength), the second electromagnetic steel plates 128b constituting the second block 124b is the second highest (medium strength), and the strength of the first electromagnetic steel plates 128a constituting the first block 124a is the lowest (low strength). That is, in the rotor core 122, the strength of the third electromagnetic steel plates 128c and the second electromagnetic steel plates 128b disposed on the end portions 122b, 122c sides is higher than that of the first electromagnetic steel plates 128a disposed in the central portion 122a. Further, in the end portions 122b, 122c of the rotor core 122, the third electromagnetic steel plates 128c having the highest strength are disposed on the sides closer to ends in the axial direction of the rotor shaft 26 than the second electromagnetic steel plates 128b. That is, the thickness of the electromagnetic steel plate 128 is increased and the strength is gradually increased from the central portion 122a toward the respective end portions 122b, 122c in the axial direction of the rotor shaft 26. With this configuration, although the stress G acting on the electromagnetic steel plate 128 increases from the central portion 122a toward the respective end portions 122b, 122c in the axial direction of the rotor shaft 26, the strength of the electromagnetic steel plates 128 disposed closer to the end portions 122b, 122c becomes higher, which makes it possible to endure the stress G. In the fourth embodiment as well, as in each of the embodiments above, the second electromagnetic steel plates 128b and the third electromagnetic steel plates 128c may have through holes for suppressing erroneous assembly of the electromagnetic steel plates 128.

As described above, even when the rotor core 122 is composed of three types of electromagnetic steel plates, that is, the first electromagnetic steel plate 128a to the third electromagnetic steel plate 128c having different thicknesses from each other, the same effect as in the embodiments above can be obtained. Specifically, because the thickness of the electromagnetic steel plates 128 disposed closer to the end portions 122b, 122c in the axial direction of the rotor shaft 26 is increased, the strength of the electromagnetic steel plates 128 disposed closer to the end portions 122b, 122c is also increased. Therefore, although the stress σ acting on the electromagnetic steel plate 128 increases toward the respective end portions 122b, 122c in the axial direction of the rotor shaft 26, the electromagnetic steel plates 128 having high strength can receive the high stress σ, which makes it possible to endure the stress σ.

Although the embodiments of the disclosure have been described in detail with reference to the drawings, the disclosure is also applicable to other modes.

For example, in the first embodiment above, one second block 50b is disposed in each end portion of the rotor core 24 in the axial direction of the rotor shaft 26. However, the number of the second blocks 50b is not limited to one for each end portion, and may be appropriately changed. For example, two or more second blocks 50b may be disposed in each end portion. Similarly, in the second embodiment above, one second block 82b and one third block 82c are disposed in each end portion of the rotor core 80 in the axial direction of the rotor shaft 26. However, the numbers of the second blocks 82b and the third blocks 82c may be appropriately changed. In short, in the rotor core, the number of blocks may be appropriately changed as long as the strength of the electromagnetic steel plates increases from the central portion toward the respective end portions in the axial direction of the rotor shaft.

Further, in the third embodiment described above, two first blocks 104a are disposed in the central portion 102a of the rotor core 102, and one second block 104b is disposed in each of the end portions 102b, 102c of the rotor core 102 in the axial direction. However, the number of blocks is not necessarily limited to this. Further, in the fourth embodiment above, two first blocks 124a are disposed in the central portion 122a of the rotor core 122, and one second block 124b and one third block 124c are disposed in each of the end portions 122b, 122c. However, the number of blocks is not necessarily limited to this. In short, in the rotor core, the number of blocks may be appropriately changed as long as the thickness of the electromagnetic steel plate is increased from the central portion toward the respective end portions in the axial direction of the rotor shaft.

Further, in each of the embodiments above, the block is assembled to the rotor shaft 26 in units of block configured by laminating the plurality of electromagnetic steel plates having the same strength. However, the electromagnetic steel plates do not necessarily need to be assembled to the rotor shaft 26 in units of block, and may be assembled to the rotor shaft 26 one by one. Even in this case, the electromagnetic steel plate having a higher strength or a thicker thickness is disposed at a position closer to the end portion of the rotor core in the axial direction of the rotor shaft 26.

Further, in the third embodiment described above, the first electromagnetic steel plate 108a and the second electromagnetic steel plate 108b are made of the same material. However, the first electromagnetic steel plate 108a and the second electromagnetic steel plate 108b may be made of different materials from each other. For example, the first electromagnetic steel plate 108a disposed in the central portion 102a of the rotor core 102 may be made of a material having relatively low strength, and the second electromagnetic steel plates 108b disposed in the end portions 102b, 102c may be made of a material having relatively high strength. In short, the material and thickness of the electromagnetic steel plates disposed in the end portions of the rotor core in the axial direction of the rotor shaft may be both varied within a range in which the electromagnetic steel plates disposed in the end portions have higher strength than that of the electromagnetic steel plate disposed in the central portion in the axial direction.

Further, in the third embodiment described above, the rotor core 102 is composed of the first electromagnetic steel plate 108a and the second electromagnetic steel plate 108b having different thicknesses from each other. In the fourth embodiment, the rotor core 122 is composed of the first electromagnetic steel plate 128a to the third electromagnetic steel plate 128c having different thicknesses from each other. However, the rotor core may be further composed of four or more types of electromagnetic steel plates having different thicknesses from each other.

Further, in the first embodiment described above, the through hole 52 is provided in the second electromagnetic steel plate 25b. In the second embodiment, the first through hole 86 is provided in the second electromagnetic steel plate 84b and the second through hole 88 and the third through hole 90 are provided in the third electromagnetic steel plate 84c. In the third embodiment, the through hole 106 is provided in the second electromagnetic steel plate 108b. However, the through holes are not essential components, and may not necessarily be provided.

Further, in the first and second embodiments above, the electromagnetic steel plates having high strength are disposed in the end portions of the rotor core 24, 80 in the axial direction of the rotor shaft 26. However, the electromagnetic steel plate having high strength may be disposed in only one end portion of the rotor core in the axial direction of the rotor shaft 26. Further, in the third and fourth embodiments above, the electromagnetic steel plates that are thick are provided in the end portions of the rotor core 102, 122 in the axial direction of the rotor shaft 26. However, the electromagnetic steel plate that are thick may be disposed in only one end portion of the rotor core in the axial direction of the rotor shaft 26.

Further, in each of the embodiments above, the rotor cores 24, 80, 102, 122 are all fitted to the rotor shaft 26 in the interference fit state. However, the rotor cores 24, 80, 102, 122 may be fitted to the rotor shaft 26 in a transition fit state.

Further, in the first embodiment above, the keys 62 are provided in the electromagnetic steel plate 25 and the key grooves 64 are provided in the rotor shaft 26. However, the key grooves may be provided in the electromagnetic steel plate 25, the keys may be provided in the rotor shaft 26.

The above description is merely an example, and the disclosure can be implemented in various modified and improved modes based on the knowledge of those skilled in the art.

What is claimed is:

1. A rotor of a rotary electric machine for a vehicle, comprising:
   a rotor shaft; and
   a rotor core including a plurality of electromagnetic steel plates fitted to an outer peripheral surface of the rotor shaft in an interference fit state or a transition fit state,
   wherein the electromagnetic steel plates include a first electromagnetic steel plate and a second electromagnetic steel plate that is made of a material having a higher mechanical strength than a material of the first electromagnetic steel plate, the second electromagnetic steel plate being disposed in at least one of end portions of the rotor core in an axial direction of the rotor shaft and the first electromagnetic steel plate being disposed in a central portion of the rotor core in the axial direction of the rotor shaft.

2. The rotor of the rotary electric machine for the vehicle according to claim 1, wherein:
   the first electromagnetic steel plate is disposed in the central portion of the rotor core in the axial direction of the rotor shaft, and the second electromagnetic steel plate is disposed in each of the end portions of the rotor core in the axial direction of the rotor shaft.

3. The rotor of the rotary electric machine for the vehicle according to claim 2, wherein the second electromagnetic steel plate includes a through hole at the same position in a state where the rotor core is assembled to the rotor shaft, the through hole penetrating the second electromagnetic steel plate in the axial direction of the rotor shaft.

4. The rotor of the rotary electric machine for the vehicle according to claim 3, wherein in the state where the rotor core is assembled to the rotor shaft, holes are provided in the end portions of the rotor core in the axial direction of the rotor shaft by the through holes at the same position in a circumferential direction of the rotor core.

5. The rotor of the rotary electric machine for the vehicle according to claim 3, wherein the electromagnetic steel plate includes a housing hole for housing a magnet, and the through hole is provided on an inner peripheral side in a radial direction of the electromagnetic steel plate with respect to the housing hole.

6. The rotor of the rotary electric machine for the vehicle according to claim 3, wherein:
   a key provided in one of the electromagnetic steel plate and the rotor shaft is fitted to a key groove provided in the other of the electromagnetic steel plate and the rotor shaft such that a relative rotation between the electromagnetic steel plate and the rotor shaft is restricted; and
   the through hole is provided at a position distant from the key or the key groove provided in the second electromagnetic steel plate by a predetermined angle in the circumferential direction.

7. The rotor of the rotary electric machine for the vehicle according to claim 1, wherein:
   a thickness of the second electromagnetic steel plate disposed closer to an end portion of the rotor core in the axial direction of the rotor shaft is greater than that of the first electromagnetic steel plate.

8. The rotor of the rotary electric machine for the vehicle according to claim 7, wherein:
   the first electromagnetic steel plate is disposed in the central portion of the rotor core in the axial direction of the rotor shaft, and the second electromagnetic steel plate is disposed in each of the end portions of the rotor core in the axial direction of the rotor shaft.

9. The rotor of the rotary electric machine for the vehicle according to claim 1, wherein:
   the rotor core includes a third electromagnetic steel plate; and
   the strength of the electromagnetic steel plate disposed closer to an end portion in the axial direction of the rotor shaft is higher that the strength of the electromagnetic steel plate disposed in the central portion of the rotor shaft.

* * * * *